United States Patent
Wakayama et al.

(10) Patent No.: US 7,561,099 B2
(45) Date of Patent: Jul. 14, 2009

(54) RADAR DEVICE

(75) Inventors: Toshio Wakayama, Tokyo (JP);
Takayuki Inaba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 11/747,440

(22) Filed: May 11, 2007

(65) Prior Publication Data
US 2008/0165049 A1 Jul. 10, 2008

(30) Foreign Application Priority Data
Jan. 9, 2007 (JP) .............................. 2007-001755

(51) Int. Cl.
*G01S 13/00* (2006.01)
*H01Q 3/00* (2006.01)

(52) U.S. Cl. .......................... 342/85; 342/368; 342/371

(58) Field of Classification Search ............... 342/26 R, 342/26 A, 26 B, 26 C, 26 D, 85, 91, 92, 175, 342/368–377, 70–72
See application file for complete search history.

(56) References Cited

U.S. PATENT DOCUMENTS

| | | | | | |
|---|---|---|---|---|---|
| 3,810,178 | A | * | 5/1974 | Basard et al. | 342/205 |
| 4,169,255 | A | * | 9/1979 | Hulsman et al. | 367/100 |
| 4,268,829 | A | * | 5/1981 | Baurle et al. | 342/380 |
| 4,315,325 | A | * | 2/1982 | Blades | 367/98 |
| 4,435,707 | A | * | 3/1984 | Clark | 342/26 B |
| 5,943,010 | A | * | 8/1999 | Rudish et al. | 342/372 |
| 6,040,795 | A | * | 3/2000 | Watanabe | 342/70 |
| 6,188,348 | B1 | * | 2/2001 | Raney | 342/22 |
| 6,420,995 | B1 | * | 7/2002 | Richmond et al. | 342/45 |
| 6,593,874 | B2 | * | 7/2003 | Yamashita | 342/118 |
| 7,345,620 | B2 | * | 3/2008 | Voigtlaender et al. | 342/82 |

FOREIGN PATENT DOCUMENTS

JP  2001-201568  7/2001

OTHER PUBLICATIONS

Merrill I. Skolnick, "Introduction to Radar Systems," Third Edition, McGraw-Hill Higher Education, 2001, table of contents and pp. 610-615.
U.S. Appl. No. 11/747,440, filed May 11, 2007, Wakayama et al.
U.S. Appl. No. 11/848,807, filed Aug. 31, 2007, Wakayama et al.

* cited by examiner

*Primary Examiner*—Thomas H Tarcza
*Assistant Examiner*—Peter M Bythrow
(74) *Attorney, Agent, or Firm*—Oblon, Spivak, McClelland, Maier & Neustadt, P.C.

(57) ABSTRACT

To provide a radar device that is capable of performing both of long-distance detection performance and short-distance wide-angle monitor in a DBF system radar, there is provided a radar device of a digital beam forming system that radiates waves toward a space, receives a reflected wave that is reflected by an object which exists within the space, and subjects the received reflected wave to signal processing to thereby measure the object, the radar device including a transmitting antenna that radiates waves toward an observation range where required maximum distances different in respective azimuths are assumed, and has a directivity characteristic in which the transmitting gains in the respective azimuths are set on the basis of the distance attenuation characteristic at the required maximum distances.

11 Claims, 5 Drawing Sheets

RADAR DEVICE

BACKGROUND OF THE INVENTION

1. Field of the Invention

The present invention relates to a radar device that irradiates an observation area where a required maximum distance different in each azimuth is assumed with waves, and uses a transmission antenna having directivity characteristics that are set on the basis of distance attenuation characteristics in which the transmission gains in the respective azimuths are set on the basis of the distance attenuation characteristics at the required maximum distances.

2. Description of the Related Art

Up to now, there has been known a radar device of a digital beam forming (DBF) system (for example, refer to Merrill I. Skolnik, Introduction to Radar Systems, Third Edition, pp. 610 to 615, McGraw-Hill, 2001). In the radar device of the DBF system, electric waves are transmitted by an antenna having a wide beam width, and a plurality of receiving beams having a narrow beam width a recombined together within an electric wave irradiated area to detect a target.

According to the radar device of the DBF system, since the beams for reception are logically combined with each other, it is possible to conduct radar observation in a plurality of directions at the same time. For example, in the case of the radar that conducts mechanical scan with antenna beams, because the plurality of directions are measured in time division, there occurs a difference in observation time depending on the observation directions. However, the DBF system does not suffer from such a problem. Also, in the case of measuring the wide angle range, a period of time during which scanning is conducted by the antenna in one cycle becomes a time resolution per one direction in the mechanical scan antenna. Accordingly, the time resolution is subjected to the mechanical limit of the antenna scan. On the contrary, in the DBF system, because it is unnecessary to conduct the mechanical scan, the observation can be repeated in a short time, that is, observation can be conducted with a high time resolution, within a range that is permitted by the detection performance.

SUMMARY OF THE INVENTION

However, in the DBF system, it is necessary to irradiate all of areas where the beams for reception are formed with beams for transmission. This means that the beam for transmission width is wide. Because the beam for transmission widths in the respective directions are wide, the gain of the transmitting antenna is low. This leads to such a problem that a maximum detection distance at which the target can be detected is shortened.

The present invention has been made to solve the above-mentioned problem, and therefore an object of the present invention is to provide a radar device that is capable of performing both of long-distance detection performance and short-distance wide-angle monitor in a DBF system radar.

According to the present invention, there is provided a radar device of a digital beam forming system that radiates waves toward a space, receives a reflected wave that is reflected by an object which exists within the space, and subjects the received reflected wave to signal processing to thereby measure the object, the radar device including a transmitting antenna that radiates waves toward an observation range where required maximum distances different in respective azimuths are assumed, and has a directivity characteristic in which the transmitting gains in the respective azimuths are set on the basis of the distance attenuation characteristic at the required maximum distances.

The radar device according to the present invention is advantageous in that both of the long-distance detection performance and the short-distance wide-angle monitor can be performed in the DBF system radar.

DETAILED DESCRIPTION OF THE PREFERRED EMBODIMENTS

First Embodiment

Figure 1:
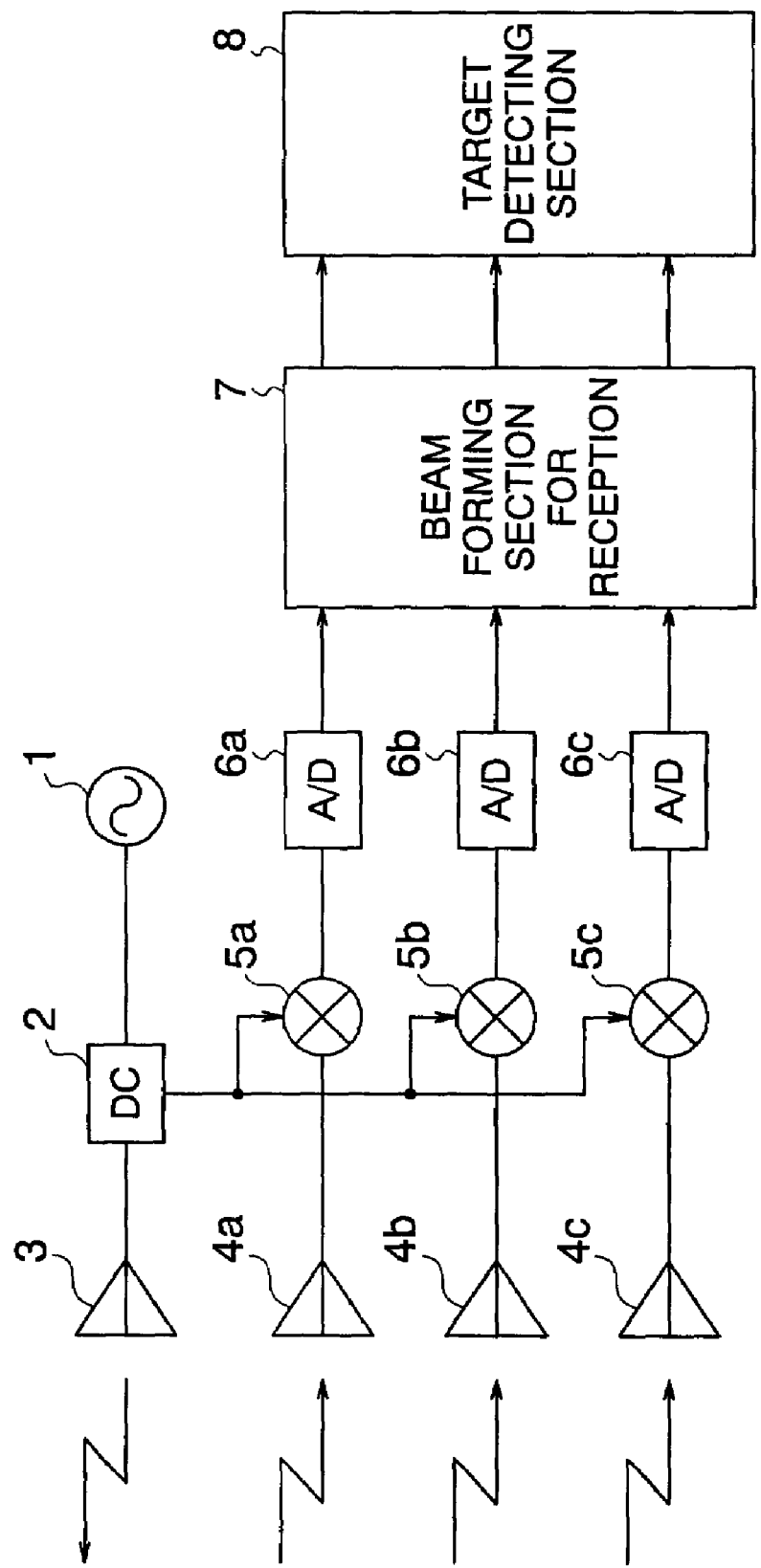
FIG. 1 is a diagram showing the configuration of a radar device according to a first embodiment of the present invention.

A description will be given of a radar device according to a first embodiment of the present invention with reference to FIGS. 1 to 4. FIG. 1 is a diagram showing the configuration of the radar device according to the first embodiment of the present invention. In the following description, the same symbols denote identical or corresponding parts.

Referring to FIG. 1, the radar device according to the first embodiment includes an oscillator 1 that generates transmitting waves, a coupler (DC) 2 that extracts a part of the transmitting waves, a transmitting antenna 3 that radiates the transmitting waves toward a space, and receiving antennas 4 (4a, 4b, 4c) that take in reflected waves from the space to output received waves. The radar device also includes mixers 5 (5a, 5b, 5c) that mix the outputs of the coupler 2 with the received waves to obtain received signals resulting from converting the reflected waves into low frequencies, and AD converters (A/D) 6 (6a, 6b, 6c) that convert the received signals into digital signals from analog signals. The radar device further includes a beam forming section for reception (beam forming means) 7 that combines the digital received signals output from the respective AD converters 6 together to form a beam for reception, and a target detecting section (target detecting means) 8 that detects a target signal from the received signal that has been subjected to the beam for reception formation.

Figure 2:
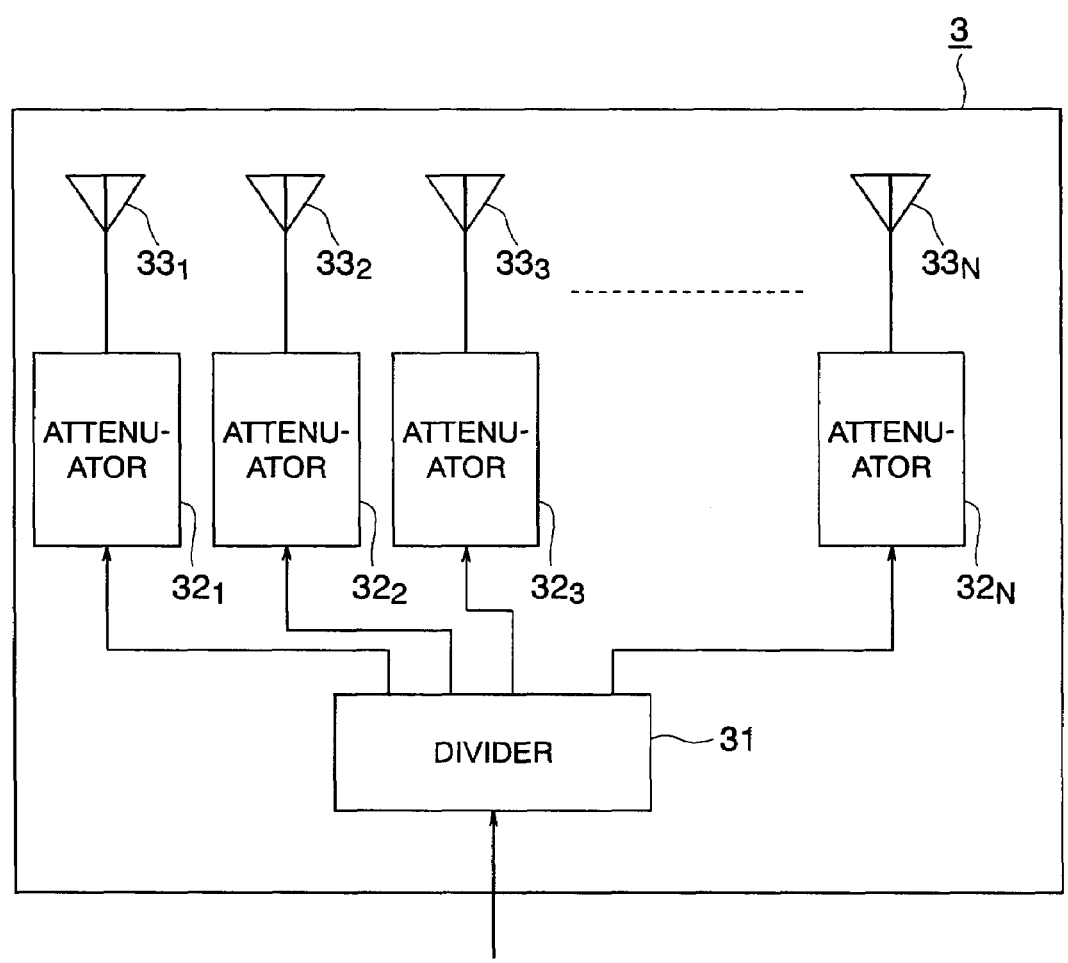
FIG. 2 is a diagram showing the configuration of a transmitting antenna in the radar device according to the first embodiment of the present invention.

FIG. 2 is a diagram showing the configuration of the transmitting antenna in the radar device according to the first embodiment of the present invention. Referring to FIG. 2, the transmitting antenna 3 in the radar device according to the first embodiment includes a distributor 31, attenuators 32 ($32_1$, $32_2$, $32_3$, ..., $32_N$), and transmitting elements 33 ($33_1$, $33_2$, $33_3$, ..., $33_N$).

Subsequently, the operation of the radar device according to the present invention will be described with reference to the accompanying drawings.

The configuration of FIG. 1 is similar to the general radar device of the DBF system, but featured in the directivity characteristics of the transmitting antenna 3.

First, the oscillator 1 generates the transmitting wave. The frequency of the transmitting wave which is frequently used in the radar is a frequency band of the microwave band or the millimeter band. For example, the transmitting waves of those frequency bands may be generated by the oscillator 1, but this embodiment does not particularly limit the transmitting frequency band.

In general, because the transmitting wave used in the radar device is subjected to some modulation in order to obtain the distance information of a target, the oscillator 1 outputs the transmitting wave that has been subjected to required modulation. As the modulation systems that have been frequently employed up to now, there have been known, for example, pulse modulation and frequency modulation continuous wave (FMCW) modulation. In this embodiment, the modulating system of the transmitting wave is not particularly limited. However, for example, in the case of using pulse modulation, a time difference since the transmitting wave is transmitted until the received signal is received is in proportion to a distance from the radar to the target. Also, in the case of using the FMCW modulation, the distance information of the target signal is contained in the frequency of the received signal (generally called "beat signal") obtained by mixing the transmitting wave and the receiving wave together. As a result, the target distance can be obtained through the signal processing of the target detecting section 8.

The coupler 2 outputs the transmitting waves that have been generated by the oscillator 1 to the transmitting antenna 3, and also outputs a part of the transmitting waves to the mixers 5a, 5b, and 5c.

The transmitting antenna 3 radiates the transmitting waves that have been input from the coupler 2 to the space. The transmitting waves that have been radiated to the space are reflected by an object that exists externally. A part of the reflected waves that have been generated in this case is returned to the position of the radar device.

The receiving antennas 4a, 4b, and 4c take in the reflected waves that have been returned to the position of the radar device, and output those reflected waves. Those receiving antennas 4a, 4b, and 4c are disposed at positions that are slightly apart from each other. For that reason, phase differences between the respective reflected waves that are received by the receiving antennas 4a, 4b, and 4c change depending on the arrival directions of the reflected waves.

The mixers 5a, 5b, and 5c mix the reflected waves that have been input from the receiving antennas 4a, 4b, and 4c, respectively, with the transmitting waves that have been input from the coupler 2, to thereby obtain and output the received signals having frequencies of the differences between the frequencies of the reflected waves and the frequencies of the transmitting waves. In the case where pulse modulated waves are transmitted as the transmitting waves, the frequency of the received signal coincides with the Doppler frequency that is in proportion to the relative velocity between the target and the radar device. Alternatively, in the case where FMCW modulated waves are transmitted as the transmitting waves, the frequencies of the received signals depend on the Doppler frequencies and the target distance.

The A/D converters 6a, 6b, and 6c convert the analog received signals that have been outputted from the mixers 5a, 5b, and 5c into digital signals. The digital received signals that have been subjected to conversion are outputted to the beam forming section for reception 7.

The beam forming section for reception 7 and the target detecting section 8 subject the digital receiving signals to digital signal processing. First, the beam forming section for reception 7 combines the received signals that are attributable to the reflected waves that have been taken in by the receiving antennas 4a, 4b, and 4c together, to separate the reflected waves in each of the arrival directions.

The method of dividing the reflected waves in each of the arrival direction can be performed by application of an arrival direction estimating process that is generally known. For example, the reflected waves can be separated in each of the arrival directions through the following method. A difference occurs in a delay time when the same reflected waves arrive at the respective receiving antennas 4 due to the difference in the positions of the receiving antennas 4. The difference in the delay time appears as a difference in the phase of the reflected waves that are taken in by the respective receiving antennas 4. For that reason, after a certain arrival direction is assumed and a difference of the phase corresponding to the arrival direction is compensated, the receiving signals corresponding to the reflected waves that have been obtained by all of the receiving antennas 4 are added together. As a result, only the received signal components corresponding to the reflected waves having the assumed arrival direction are integrated together. When the assumed arrival direction is changed by a plurality of times, and the same processing is repeated, the received signals that are separated in each of the arrival directions are obtained. That is, the received signals in each of the beam for reception directions which are oriented in the plurality of directions are logically obtained.

The received signals that have been separated in each of the arrival directions are outputted from the beam forming section for reception 7.

Subsequently, the target detecting section 8 takes in those received signals, and conducts the target detection signal processing. The target detection signal processing determines that there exists the target in the case where the inputted received signal power is sufficiently larger than a receiver noise power. The target detecting section 8 also conducts a process for sufficiently increasing the signal-to-noise ratio (SN ratio) as the occasion demands. More specifically, the received signals that have been obtained at a plurality of times are integrated together. In the integrating process, the SN ratio is improved by using the fact that the integrated degree of the signal powers is larger than the integrated degree of the receiver noise power to improve the target detection performance.

For example, when the time series of the received signals is subjected to the Fourier transform, the signal integration is conducted in each of the received signal frequencies. In the case where this process is applied to the radar device of the pulse modulation system, the target detection is conducted in each of the Doppler frequencies. Therefore, the presence or absence of the target is found, and the relative velocity along the line of sight of the target is also found. On the other hand, in the case of the radar device of the FMCW system, when the received signals are subjected to the Fourier transform, the target detection is conducted in each of the frequencies of the beat signals that depend on the relative velocity along the line of sight of the target and the distance, that is, each of the beat frequencies. Information on the relative velocity along the line of sight and the distance cannot be separated from each other by only the beat frequencies. However, as a generally known manner of the FM modulation in the FMCW system, a section in which the transmitting frequency is increased with time (up chirp), and a section in which the transmitting frequency is decreased with time (down chirp) are provided, and two beat frequencies that have been obtained by both of those sections are combined together, thereby enabling the distance and the velocity to be estimated.

The feature of the radar device according to this embodiment resides in the directivity characteristic of the transmitting antenna 3. The feature will be described with reference to FIGS. 3 and 4.

Figure 3:
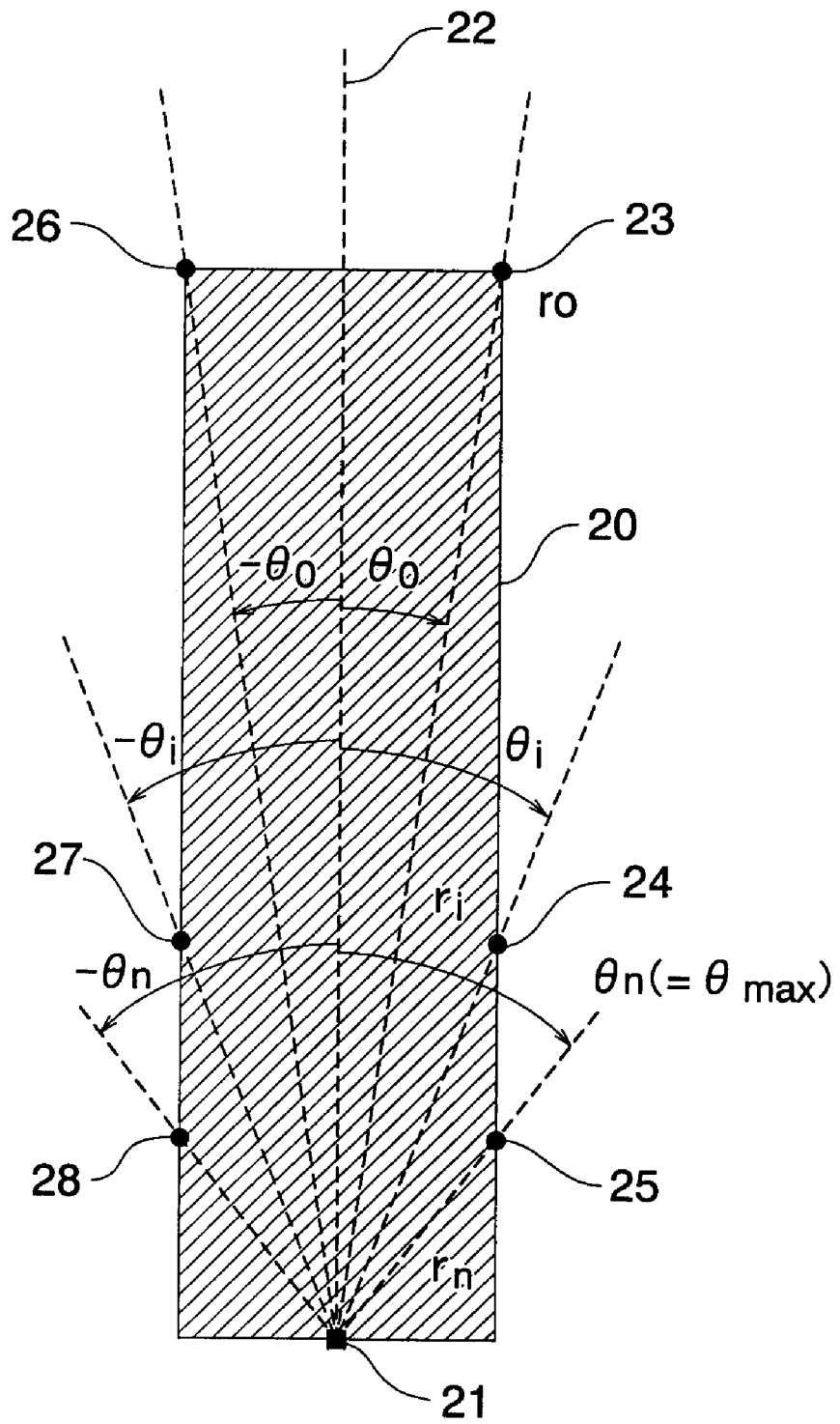
FIG. 3 is a diagram showing an azimuth and a required maximum distance within an area (coverage) to be observed by the radar device according to the first embodiment of the present invention.

FIG. 3 is a diagram showing an azimuth and a desired maximum distance within an area (observed range) to be observed by the radar device, within a coverage, according to the first embodiment of the present invention. Referring to FIG. 3, the radar device 21 is positioned at the center of a lower side of a rectangular area 20 indicated by oblique lines and having an upper side, the lower side, a left side, and a right side. Now, it is assumed that the azimuth 0 degrees of the radar device is indicated by a direction 22, an azimuth range of from an azimuth −θn to +θn of the rectangular area 20 is the area (observed range) to be observed by the radar device. In this example, three azimuths including an azimuth θ0 with respect to a direction of a line that passes through a point 23 of a right corner on the upper side of the rectangular area 20, an azimuth θi with respect to a direction of a line that passes through a point 24 on the right side, and an azimuth θn with respect to a direction of a line that passes through a point 25 on the right side are used as the representative values of the azimuths and description will be made by way of the three azimuths. The required maximum distances r max(θ) at the azimuths θ0, θi, and θn are r max(θ0)=r0, r max(θi)=ri, and r max(θn)=rn, respectively. In other words, a distance between the radar device 21 and the point 23 is r0, a distance between the radar device 21 and the point 24 is r1, and a distance between the radar device 21 and the point 25 is rn.

FIG. 3 also shows an azimuth −θ0 with respect to a direction of a line that passes through a point 26 of a left corner on the upper side of the rectangular area 20, an azimuth −θi with respect to a direction of a line that passes through a point 27 on the left side, and an azimuth −θn with respect to a direction of a line that passes through a point 28 on the left side.

In order to obtain the same target detection performance in the required maximum distances r0, ri, and rn of the respective azimuths, it is necessary to make the SN ratios identical with each other in the respective required maximum distances. In a range of the azimuth from θ0 to θn, the required maximum distances becomes shorter as the azimuths are larger. In the case of observing a target that is regarded as a dot, there has been known that the received power of the reflected wave from the target is in inverse proportion to fourth power of the distance. When it is estimated that the receiver noise is constant, the SN ratio is in inverse proportion to the fourth power of the distance. Therefore, in a range of the azimuth from θ0 to θn, the distance attenuation quantity becomes smaller as the azimuth is larger, to thereby reduce the required system gain. The feature of this embodiment resides in that a difference in the system gain is assigned to the directivity pattern of the transmitting antenna 3.

Figure 4:
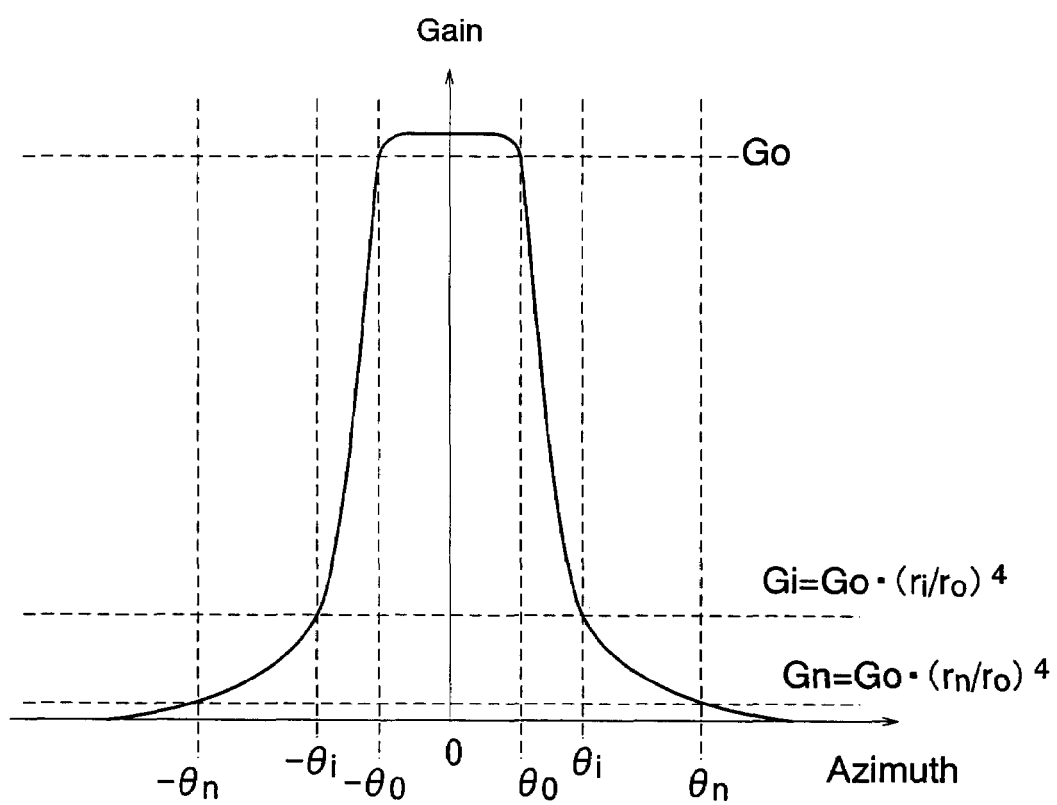
FIG. 4 is a diagram showing the directivity characteristics of the transmitting antenna in the radar device according to the first embodiment of the present invention.

FIG. 4 is a diagram showing the directivity characteristics of the transmitting antenna in the radar device according to the first embodiment of the present invention. The axis of abscissa represents the azimuth, and the axis of ordinate represents the transmission gain. It is assumed that the gains of the transmitting antennas 3 in the azimuths θ0, θi, and θn are G0, Gi, and Gn. As shown in FIG. 4, $Gi=G0 \cdot (ri/r0)^4$ and $Gn=G0 \cdot (ri/r0)^4$ are satisfied. Since the distance attenuation quantity is in proportion to the fourth power of the distance as described above, when the transmitting antenna 3 is configured in such a manner that the transmission gain is in inverse proportion to the fourth power of the required maximum distance, the SN ratio in detecting the target having an estimated minimum radar cross section can be made constant in all of the azimuths in a range of from −θn to θn.

For example, as shown in FIG. 3, it is assumed that the width of the rectangular area 20 is w at one side and 2w at both sides (between the left side and the right side). The required maximum distance r max (θ) depends on the azimuth θ. That is, the following expression is satisfied.

$r\max(\theta)=w/\sin\theta$

On the other hand, the received power Pr is in inverse proportion to the fourth power of the distance r and in proportion to the transmission gain Gt(θ). That is, the following expression is satisfied.

$Pr(r, \theta)=CGt(\theta)/r^4$

C is a constant that is determined according to the specification of the radar device. It is assumed that $s_{min}$ in is the minimum receiving sensitivity that is the minimum received signal power that can be detected by the target detecting section 8. The conditions under which the target can be detected are represented by the following expression.

$Pr(r, \theta) \geq Pr(r\max, \theta)=CGt(\theta)/r\max^4 \geq s_{min}$

Accordingly, when the transmitting antenna 3 that satisfies the following expression is used, a constant target detection performance is obtained over all of the areas within the coverage.

$Gt(\theta) \geq w^4 s_{min}/C \sin^4 \theta \equiv Gt, \min(\theta)$

That is, it is necessary to use the transmitting antenna 3 having the directivity gain that is larger than the directivity characteristic Ct, min(θ) which is in inverse proportion to $\sin^4\theta$ in an arbitrary θ within a range of −θmax<θ<θmax.

As described above, the gain of the transmitting antenna 3 is set to be low in a range of the large azimuth, thereby enabling the gain of the transmitting antenna 3 in a range of the small azimuth to be increased. This is because when the electric power that is radiated toward a range of the larger azimuth of the transmitting antenna 3 is reduced in distributing and radiating the power of the transmitting wave that has been inputted to the transmitting antenna 3 to the respective azimuths, it is possible to increase the electric power that is radiated toward other ranges, that is, a range of the smaller azimuth.

The above description is given of the directivity characteristics in which the gain of the transmitting antenna 3 is in inverse proportion to the fourth power of the required maximum distance. The directivity characteristics have the maximum efficiency. However, in each azimuth, when there is provided the directivity characteristics having the gain larger than the gain that is in inverse proportion to the fourth power of the required maximum distance, the system gain at the long distance in the range of the smaller azimuth is deteriorated, but the SN ratio of the wide angle and short distance is set to be high. The situation that the SN ratio at the short distance is increased means that the detection precision at the short distance, that is, the relative distance measurement precision or the relative velocity measurement precision is improved. For example, in the case of the radar device that is mounted on a moving body and detects an obstacle that exists in a travel direction, the possibility that the obstacle collides with the moving body after a short time is higher as the obstacle exists at a shorter distance. Hence, the measurement of the short-distance target with high precision is effective in the prevention of collision.

In the case where the directivity characteristics shown in FIG. 4 is realized by, for example, an array antenna, it is necessary to adjust the amplitudes of the transmitting waves of the respective elements of the array antenna so that the excitation distribution on the array antenna surface is subjected to the Fourier transform having the characteristics shown in FIG. 4.

The structural example of the above-mentioned transmitting antenna 3 is shown in FIG. 2. The transmitting antenna 3 distributes the inputted transmitting waves to N transmitting elements $33_1$ to $33_N$ by means of the distributor 31. N attenuators $32_1$ to $32_N$ are inserted on the way where the transmitting waves are distributed to the transmitting elements 33. The attenuation quantity of the attenuator 32 is adjusted in such a manner that the excited current is different depending on the transmitting elements 33. For that reason, the excitation distribution of a current that is obtained by spatially disposing the transmitting elements 33 is made to coincide with the inverse Fourier transform, to thereby obtain a desired pattern, that is, a pattern shown in FIG. 4 as the directivity characteristics of the transmitting antenna 3. The attenuators $32_1$ to $32_N$ are employed in FIG. 2. Alternatively, when the attenuators $32_1$ to $32_N$ are replaced with amplifiers and the gains of the amplifiers are adjusted, the output power in each of the transmitting elements $32_1$ to $32_N$ can be changed. Also, in the case where the ratio of the distribution of the output power of the distributor 31 can be different from each other in each of the output terminals, it is unnecessary to insert the attenuators 32. For example, in the case where an electric power is supplied to the transmitting antenna by using a microstrip line, the widths of the lines that have been branched to the respective transmitting elements $33_1$ to $33_N$ are changed in each of branches, the electric powers that are different in each of the branch lines are supplied.

As described above, when the configuration of the radar observation area is limited, in the case of the radar device that is mounted on, for example, a vehicle and monitors the front of the vehicle, it is possible to suppress the reduction of the target detection performance at the long distance which is caused by widening the beam width of the transmitting antenna 3 to a minimum value. That is, it is possible to realize the detection of the long-distance target within a narrow angle range and the target detection performance within a wide angle range which is limited to the short distance at the same time.

In particular, there is provided the directivity characteristics of the transmitting antenna 3 which are in inverse proportion to $\sin^4\theta$ with respect to the azimuth $\theta$, thereby enabling the target detection performance over the entire coverage to be realized most efficiently. That is, because the transmitting wave power that is radiated from the transmitting antenna 3 can be most efficiently used, it is possible to minimize the transmitting wave power. This contributes to the reduction of the power consumption, and minimizes the degree of the interference that is given to other radars.

In the above description, it is assumed that the intensity of the received signal is in inverse proportion to the fourth power of the given maximum distance, but there is a case in which the atmospheric attenuation cannot be ignored as the distance attenuation. In the case where the atmospheric attenuation is large, the effect of the atmospheric attenuation characteristics must be taken into account in addition to the effect where the intensity of the received signal is in inverse proportion to the fourth power of the distance. The attenuation expressed by logarithm while the electric wave is propagated by a unit distance is held constant. That is, since the attenuation that is expressed by logarithm is in proportion to the propagation distance of electric waves, it is necessary to set the directivity characteristics of the transmitting antenna 3 in addition to that effect.

Also, a case where a measurement range is in an extremely short distance from the radar may be out of the characteristics that the distance attenuation is in inverse proportion to the fourth power of the distance. In the case where the short-distance area is the observation area, that is, in the case where the required maximum distance is a near field, it is necessary to determine the directivity characteristics of the transmitting antenna 3 taking the distance attenuation characteristics of the near field into consideration. The distance attenuation characteristics of the near field can be easily obtained by using the electromagnetic field analyzing method that has been generally known.

Second Embodiment

Figure 5:
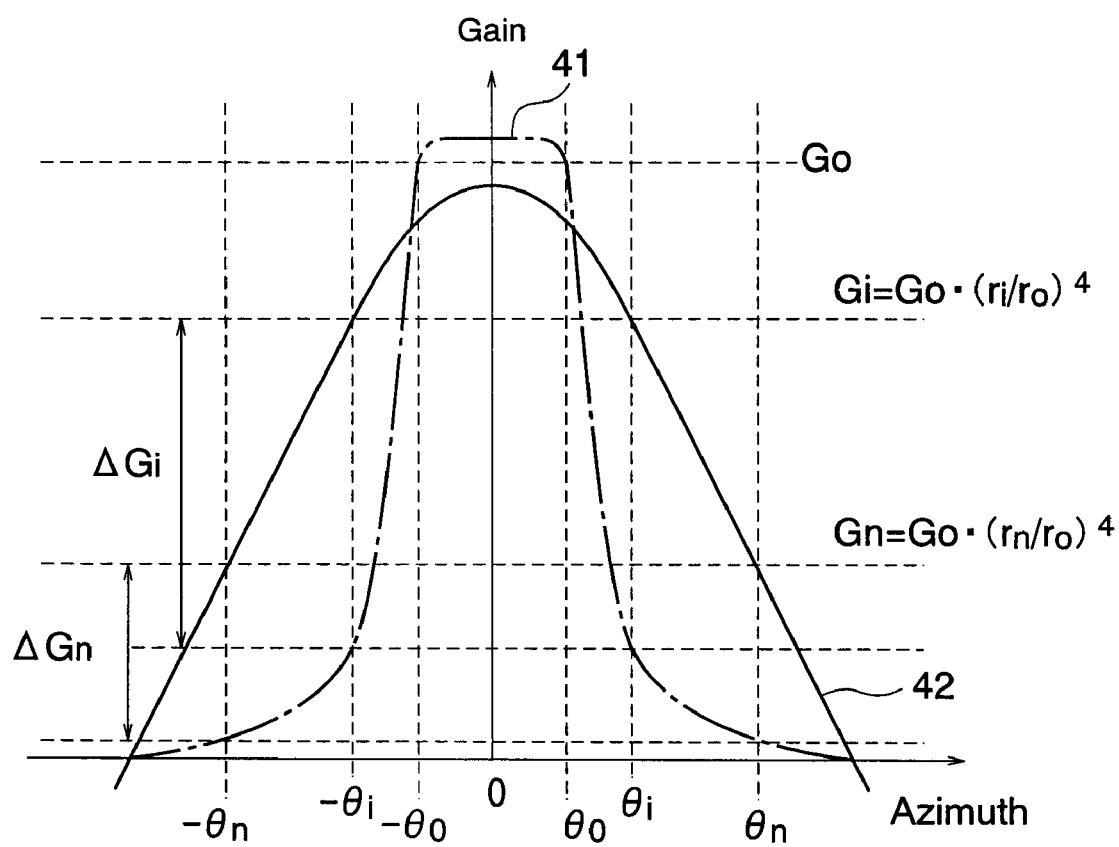
FIG. 5 is a diagram showing the directivity characteristics of the transmitting antenna in a radar device according to a second embodiment of the present invention.

A radar device according to the second embodiment of the present invention will be described with reference to FIG. 5. FIG. 5 is a diagram showing the directivity characteristics of the transmitting antenna in a radar device according to the second embodiment of the present invention.

In the above-mentioned first embodiment, the difference in the distance attenuation at the required maximum distance in the respective azimuths is assigned to the difference in the gain of the transmitting antenna 3, to thereby effectively allocate the transmitting power of the radar device to the respective azimuths. However, the allocation of the radar resource can be adjusted by means other than the gain of the transmitting antenna 3. In the second embodiment, the allocation of the radar resource is assigned to a signal processing rate.

The radar device according to the second embodiment is identical in the configuration with the first embodiment, but is different in the directivity characteristics of the transmitting antenna 3 from the first embodiment. Referring to FIG. 5, the characteristics indicated by a dashed line represent the directivity characteristic 41 of the transmitting antenna 3 which is described in the above-mentioned first embodiment, and the characteristics indicated by a solid line represent the directivity characteristics 42 of the transmitting antenna 3 in the radar device according to the second embodiment.

The target detecting section (target detecting means) 8 inputs the received signal obtained from the received reflected wave, and detects the target signal with a time resolution that is different depending on the required maximum distance.

Referring to FIG. 5, when the two directivity characteristics 41 and 42 are compared with each other, the gain of the directivity characteristics 42 is lower than the gain of the directivity characteristics 41 in an area where the azimuth is smaller. For that reason, when the performances of the structural elements except for the transmitting antenna 3 are identical with each other, the target detection performance at the long distance in the range where the azimuth is smaller is lower than that in the first embodiment. For example, the maximum detection distance is shortened in that azimuth range. However, the gain of the directivity characteristics 42 is larger than the gain of the directivity characteristics 41 as the azimuth is larger. For example, the gain Gi of the directivity characteristics 42 is larger than the gain of the directivity characteristics 41 by $\Delta Gi$ in the azimuth $\theta i$ whereas the gain Gn of the directivity characteristics 42 is larger than the gain of the directivity characteristics 41 by $\Delta Gn$ in the azimuth $\theta n$. In the above-mentioned area, when the performances of the structural elements except for the transmitting antenna 3 are identical with each other, the gain of the system becomes excessive. It is possible to allocate the excessive system gain to the data output rates. In other words, it is possible to shorten the time of the signal integration in a range where the azimuth is larger. When the time of the signal integration is shortened, the signal processing gain that is determined according to the time resolution of the signal processing at the required maximum distance is deteriorated. However, it is possible to improve the time resolution that outputs the signal processing results, that is, the output data rates. When the ratio of the reduction of the signal processing gain which is caused by shortening the signal integration time is made identical with the gain ratio of the directivity characteristics 41 and the directivity characteristics 42, it is possible to ensure the target detection performance at the required maximum distance without depending on the azimuths.

A relationship between the signal integration time and the signal processing gain is changed according to how to conduct the signal integration. In the case of using the integrating method called "coherent integration", that is, a method of adding the signals in the same phase within the correlative time of the signal together, the signal processing gain is in proportion to the signal integration time, that is, the time resolution. Accordingly, in the case of using the coherent integration, it is necessary to set the ratio of the reduction of the above-mentioned signal processing gain assuming that the signal integration time is in proportion to the signal processing gain. On the other hand, in the case of using an integrating method called "incoherent integration", that is, a method of adding states in which the phases are eliminated, for example, the electric power values together, the signal processing gain is in proportion to the signal integration time, that is, the square root of the time resolution. Hence, in the case of using the incoherent integration, it is necessary to set the ratio of the reduction of the above-mentioned signal processing gain assuming that the signal processing gain is in proportion to the square root of the signal integration time.

It is possible, as in the case of the directivity characteristics 42, to relatively easily realize the antenna having a beam width wider than the directivity characteristics 41. For example, an antenna having a Gaussian main beam characteristic has been well known. The Gaussian function is a concave function at the inside of the width which is determined according to the standard deviation from the center. Therefore, it is understood that when the beam width is widened to some degree, the higher gain is obtained in a larger azimuth range than the directivity characteristics 41 having the convex configuration.

Also, in the above description, the data rate is changed in a range where the azimuth is larger. However, even in a range where the azimuth is smaller, it is possible to obtain a given target detection performance even at the same data rate as that in the range where the azimuth is large in an area where the distance is short. That is, it is possible to set the same data rate at the same distance when the data rate is determined at the required maximum distance in a certain azimuth, and the same data rate is set to conduct the signal integration even at another azimuth, that is, a smaller azimuth at the same distance as the required maximum distance. In other words, the target detecting section 8 applies the time resolution of the signal processing at the required maximum distance that is assumed in each of the azimuths even to the signal having the same distance in another azimuth.

For example, in the case of the radar device that is mounted on the vehicle and monitors the front of the vehicle, a period of time required until the vehicle collides with the target is shorter in the case where the target collides with the subject vehicle, as the target is at the shorter distance. In the short-distance monitor which is high in emergency, the front monitor is conducted at a higher data rate, thereby enabling the vehicle control for preventing the collision or mitigating the collision damage to rapidly start.

Third Embodiment

A radar device according to a third embodiment of the present invention will be described.

In the above-mentioned second embodiment, a description is given of the radar device in which a difference in the distance attenuation at the required maximum distance in the respective azimuths is assigned to the difference of the gain of the transmitting antenna 3 and the difference of the time resolution in the signal processing. In the third embodiment, the allocation of the radar resource is assigned to the gain of the beam for reception combination.

The radar device according to the third embodiment is identical in the configuration with that in the first and second embodiments. Also, the third embodiment is identical with the above-mentioned second embodiment in that the directivity characteristics of the transmitting antenna 3 are higher in that in the first embodiment in the range where the azimuth is larger as shown in FIG. 5. A difference from the above-mentioned second embodiment resides in that the excessive system gain is allocated to not the data rate but the gain of the beam for reception combination.

The transmitting antenna 3 has the directivity characteristics that are set on the basis of the above-mentioned distance attenuation characteristics and the directivity gain of the beam for reception. The beam forming section for reception (beam forming means) 7 combines the received signals together to form the beam for reception having the beam for reception pattern different depending on the required maximum distance.

It is assumed that a case in which $\Delta w$ is obtained as the spatial resolution in a direction orthogonal to the required maximum distance direction when the radar device monitors the front of the vehicle. The spatial resolution in the direction orthogonal to the required maximum distance direction is determined according to the angle resolution in the beam for reception combination. It is assumed that the angle resolution is $\Delta\theta$. In the case of observing the distance r, a relationship between the angle resolution $\Delta\theta$ and the spatial resolution $\Delta w$ is represented by the following expression.

$$\Delta w = r\Delta\theta$$

When the spatial resolution $\Delta w$ is fixed, the distance r and the angle resolution $\Delta\theta$ are in inverse proportion to each other. Accordingly, in order to obtain the same spatial resolution $\Delta w$, it is necessary that the angle resolution $\Delta\theta$ is larger as the distance is shorter. When the angle resolution $\Delta\theta$ is large, that is, the beam for reception is wide, the gain in the beam for reception combination is deteriorated, which is compensated by making the gain of the transmitting antenna 3 excessive. Because the number of beams for reception required for covering the entire angle range can be reduced since the beam for reception width is wide, it is possible to reduce the arithmetic quantity of the beam for reception combination.

What is claimed is:

1. A radar device of a digital beam forming system that radiates waves toward a space, receives a reflected wave that is reflected by an object which exists within the space, and subjects the received reflected wave to signal processing to thereby measure the object, the radar device comprising:

a transmitting antenna configured to radiate waves toward an observation range where required maximum distances different in respective azimuths are assumed, has a directivity characteristic in which the transmitting gains in the respective azimuths are set on the basis of the distance attenuation characteristic at the required maximum distances, wherein the transmitting antenna has a directivity characteristic that is set on the basis of the distance attenuation characteristic and a signal processing gain that is determined according to a time resolution of the signal processing at the required maximum distances.

2. A radar device according to claim 1, wherein the transmitting antenna has a directivity characteristic in which the gains in the respective azimuths are in inverse proportion to a fourth power of the required maximum distance.

3. A radar device according to claim 1, wherein the transmitting antenna has a directivity characteristic in which the gains in the respective azimuths are larger than the transmitting gains that are in inverse proportion to the fourth power of the required maximum distance.

4. A radar device according to claim 1, wherein the transmitting antenna has a directivity characteristic in which the distance attenuation characteristic is set taking atmospheric attenuation characteristic into consideration in a case where the atmospheric attenuation is large.

5. A radar device according to claim 1, wherein the transmitting antenna has a directivity characteristic that is set taking the distance attenuation characteristic in a near field into consideration in a case where the required maximum distances are in the near field.

6. A radar device according to claim 1, wherein the radar device further includes target detecting means that inputs a received signal obtained from the reflected wave and detects the target signal with a time resolution that is different depending on the required maximum distances.

7. A radar device according to claim 6, wherein the signal processing gain is in proportion to the time resolution.

8. A radar device according to claim 6, wherein the signal processing gain is in proportion to a square root of the time resolution.

9. A radar device according to claim 1, wherein the target detecting means applies the time resolution of the signal processing at the required maximum distances that are assumed in each of the azimuths to signals at the same distance in other azimuths.

10. A radar device according to claim 1, wherein the transmitting antenna has the directivity characteristic that is set on the basis of the distance attenuation characteristic and the directivity gain of the beam for reception, and wherein the radar device further includes a plurality of receiving antennas that receive the reflected waves, and beam forming means that combines the reflected waves received by the plurality of receiving antennas together to form a beam for reception, and forms a beam for reception having beam for reception patterns that are different depending on the required maximum distances.

11. A radar device according to claim 1, wherein the time resolution is a period of time during which scanning is conducted by the antenna in one cycle.

* * * * *